(12) United States Patent
Soeda (10) Patent No.: US 9,989,160 B2
(45) Date of Patent: Jun. 5, 2018

(54) PUMP DEVICE

(71) Applicant: HITACHI AUTOMOTIVE SYSTEMS, LTD., Hitachinaka-shi, Ibaraki (JP)

(72) Inventor: Jun Soeda, Fujisawa (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days. days.

(21) Appl. No.: 15/450,304

(22) Filed: Mar. 6, 2017

(65) Prior Publication Data

US 2017/0268682 A1  Sep. 21, 2017

(30) Foreign Application Priority Data

Mar. 18, 2016 (JP) .................. 2016-055825

(51) Int. Cl.
*F16K 15/04* (2006.01)
*F04C 14/26* (2006.01)
*F04C 2/344* (2006.01)

(52) U.S. Cl.
CPC .......... *F16K 15/048* (2013.01); *F04C 2/3441* (2013.01); *F04C 14/26* (2013.01); *F16K 15/044* (2013.01); *Y10T 137/86019* (2015.04)

(58) Field of Classification Search
CPC .... F16K 15/048; F16K 15/044; F04C 2/3441; F04C 14/26; Y10T 137/86019
See application file for complete search history.

(56) References Cited

U.S. PATENT DOCUMENTS

| 6,375,441 B1* | 4/2002 | Ichizuki | F01C 21/0863 418/133 |
| 6,503,068 B2* | 1/2003 | Kojima | F04C 14/226 417/204 |
| 7,070,399 B2* | 7/2006 | Konishi | F01C 21/0863 417/213 |
| 7,318,705 B2* | 1/2008 | Uchino | F01C 21/0863 417/220 |
| 8,506,270 B2 | 8/2013 | Soeda | |
| 2011/0142703 A1 | 6/2011 | Soeda | |

FOREIGN PATENT DOCUMENTS

JP  2012-082762 A  4/2012

* cited by examiner

*Primary Examiner* — Craig Schneider
*Assistant Examiner* — Kevin Barss
(74) *Attorney, Agent, or Firm* — Foley & Lardner LLP (57) ABSTRACT

A pump device 1 includes a relief valve 42 having a ball 45 and a valve seat 44. The valve seat 44 has a ring-shaped seat surface 52 having a wide portion 52a and a narrow portion 52b on which the ball 45 is seated. Upon valve opening, the ball 45 is pressed in a valve opening direction by a pressing force F1 according to a pressure P of working fluid while being pressed against the wide portion 52a. The ball 45 rolls on the seat surface 52 upon the valve opening while continuing or keeping contact with the wide portion 52a. At this time, the ball 45 is stably held with the ball 45 contacting the wide portion 52a of the seat surface 52. Noise of the relief valve 42 caused by vibration of the ball 45 is therefore suppressed.

5 Claims, 10 Drawing Sheets

PUMP DEVICE

BACKGROUND OF THE INVENTION

The present invention relates to a pump device applied to, for instance, a hydraulic power steering device of a vehicle.

As is well known, a pump device is provided with a relief valve for protecting hydraulic devices from an excessive pressure increase. This relief valve has a structure in which a spherical valve body held by a valve body holding portion of a retainer is forced or pressed to a valve seat side by a coil spring. However, the relief valve has a problem of generating noise caused by the fact that the valve body vibrates by working fluid flowing on a surface of the valve body at valve opening.

To avoid this problem, Japanese Unexamined Patent Application Publication No. 2012-082762 (hereinafter is referred to as "JP2012-082762") discloses a technique that suppresses the noise caused by the vibration by employing the following structure; a valve seat portion on which the valve body is seated during closure of the relief valve is offset to a radial direction one side with respect to a bore center of a relief valve accommodation bore that accommodates therein the relief valve, and thus a pressing force according to a hydraulic pressure acting on the valve body has a radial direction component to the radial direction one side. That is, since the valve body is held at the radial direction one side with stability during opening of the relief valve, the vibration is suppressed, then the noise caused by the vibration is suppressed.

SUMMARY OF THE INVENTION

However, JP2012-082762 does not consider a force acting on the valve body which is caused by a lean of the retainer and a force acting on the valve body which is caused by a deviation of an urging force in a circumferential direction of the coil spring, at all. Because of this, in a case where these forces act on the valve body so as to press back (or return) the valve body to a radial direction another side of the relief valve accommodation bore, the working fluid flows throughout the valve body at the opening of the relief valve, and the valve body becomes unstable then vibrates by this working fluid flow. Due to this vibration of the valve body, the noise is generated.

The present invention was made in view of the above technical problem. An object of the present invention is to provide a pump device that is capable of continuously suppressing generation of the noise at the opening of the relief valve even when a force that impairs stability of the valve body acts on the valve body.

According to one aspect of the present invention, a pump device comprises; a pump housing having a pump element accommodation space; a drive shaft rotatably supported by the pump housing; an inlet port provided in the pump housing and introducing working fluid from a reservoir tank; an outlet port provided in the pump housing; a pump element accommodated in the pump element accommodation space, sucking the working fluid from the inlet port by being rotated by the drive shaft and discharging the working fluid from the outlet port; an inlet passage provided in the pump housing and communicating with the inlet port; an outlet passage provided in the pump housing and communicating with the outlet port; a relief valve accommodation bore provided in the pump housing and having a substantially circular shape in cross section. Further, when an imaginary line passing through a bore center of the relief valve accommodation bore, which is a center of a cross section orthogonal to an axis that extends in an axial direction that is a longitudinal direction of the relief valve accommodation bore, and extending parallel to the axis, is a center axis, the pump device comprises; a valve seat provided at one end side in the axial direction of the relief valve accommodation bore and having a substantially cylindrical shape whose outer peripheral surface is shaped along a shape of an inner peripheral surface of the relief valve accommodation bore; a penetration hole that is an axial direction hole provided at the valve seat so as to penetrate the valve seat in the axial direction, the penetration hole formed so that one end portion, which is located at the one end side of the relief valve accommodation bore, of both end portions of the penetration hole communicates with the outlet passage and so that a forming position of the penetration hole on a cross section of the valve seat orthogonal to the axial direction of the relief valve accommodation bore is positioned substantially at a center of a substantially circular cross section of the relief valve accommodation bore; a seat portion provided at the other end side in the axial direction of the valve seat and formed into a ring-shape so as to encircle the penetration hole, the seat portion set so that a center of the seat portion on a cross section orthogonal to the axial direction of the relief valve accommodation bore is offset from the center axis; a spherical valve body performing opening and closure actions of the penetration hole by separation from and contact with the seat portion; a retainer provided movably in the axial direction in the relief valve accommodation bore and disposed at the other end side of the relief valve accommodation bore with respect to the valve body, the retainer having a valve body holding portion for retaining the valve body and shaft portion extending from an end surface of the valve body holding portion toward the other end side of the relief valve accommodation bore; a coil spring provided in the relief valve accommodation bore and forcing the retainer so that the valve body retained by retainer contacts the seat portion; and a relief vent provided at the other end side of the relief valve accommodation bore with respect to the valve seat so as to be open to the relief valve accommodation bore, the relief vent discharging the working fluid in the relief valve accommodation bore into the inlet passage. And, when a radial direction component, with respect to the center axis, of a pressing force according to a pressure of the working fluid in the penetration hole which the valve body receives in an inner side area of the ring-shaped seat portion in a state in which the valve body contacts the seat portion is $F1x$, and a radial direction component, with respect to the center axis, of a force which reduces the radial direction component $F1x$ due to lean of the retainer with respect to the center axis is $F2x$, and also a radial direction component, with respect to the center axis, of a force according to an urging force of the coil spring, which reduces the radial direction component $F1x$ is $F3x$, the seat portion is formed so as to satisfy an expression of $F1x > F2x + F3x$.

According to the present invention, it is possible to continuously suppress the generation of the noise at the opening of the relief valve even when a force that impairs stability of the valve body acts on the valve body.

The other objects and features of this invention will become understood from the following description with reference to the accompanying drawings.

BRIEF DESCRIPTION OF THE DRAWINGS

FIG. 6 is a drawing showing an essential part of FIG. 3 with forces acting on the valve body caused by a lean of a retainer indicated by vectors. In FIG. 6, a hatch pattern of the retainer is omitted for convenience.

DETAILED DESCRIPTION OF THE INVENTION

Embodiments of a pump device of the present invention will be explained below with reference to the drawings. Each embodiment shows, as an example, that the pump device is applied to a power steering apparatus of a vehicle.

First Embodiment

Figure 1:
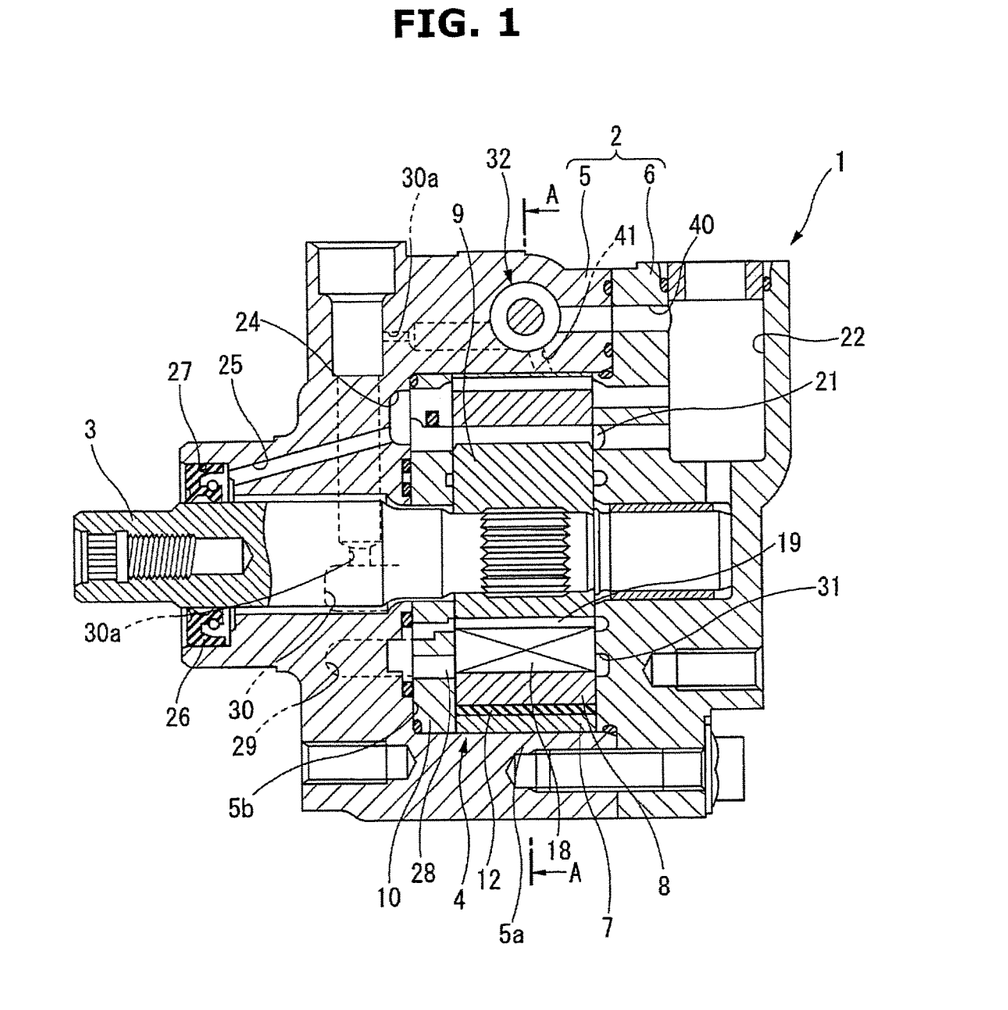
FIG. 1 is a longitudinal cross section of a pump device according to embodiments of the present invention.
Figure 2:
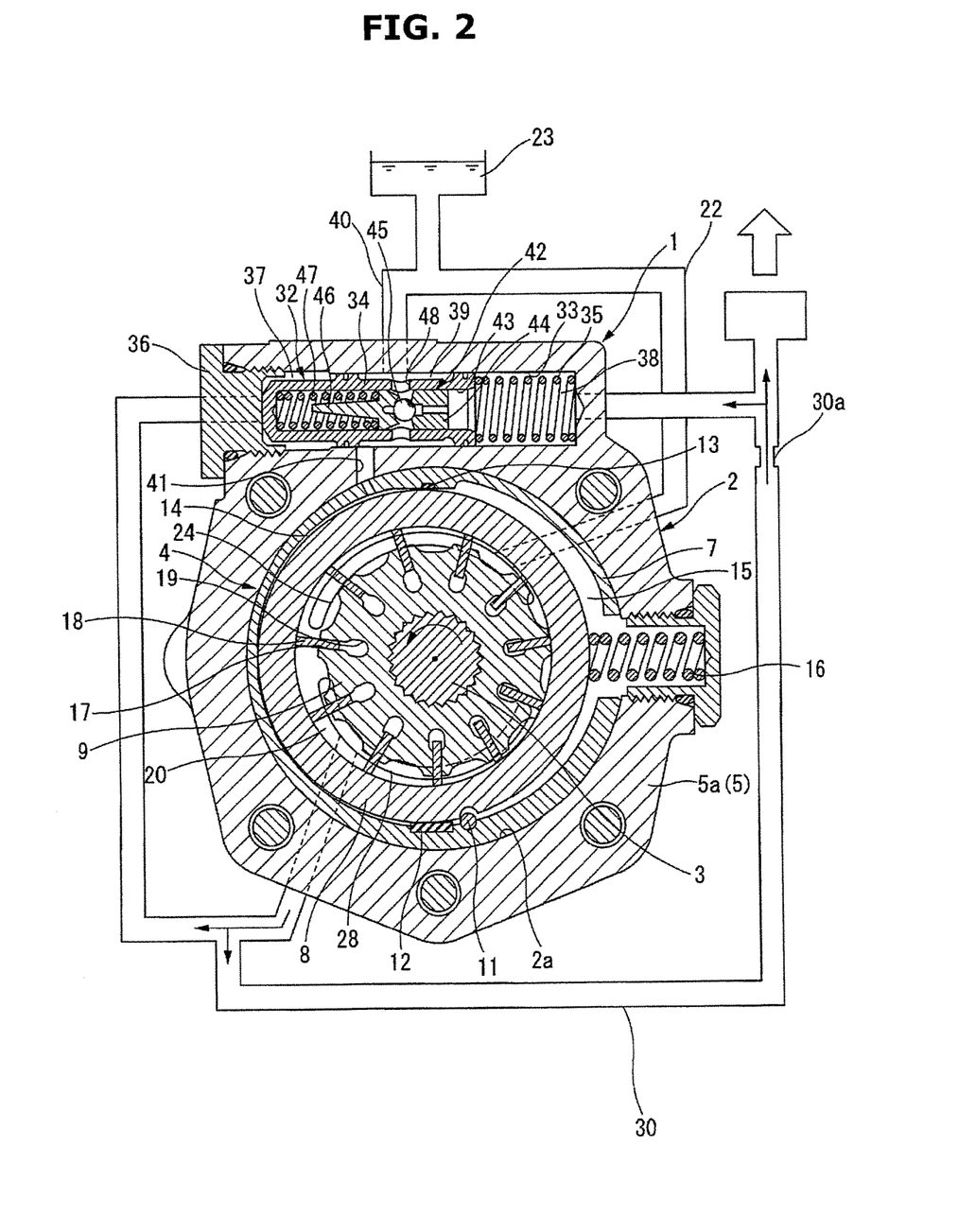
FIG. 2 is a longitudinal sectional view taken along A-A line of FIG. 1.

A pump device 1 of the present invention is a so-called variable displacement vane pump (or variable delivery vane pump). As shown in FIGS. 1 and 2, the pump device 1 has a pump housing 2 having therein a pump element accommodation chamber 2a as a pump element accommodation space, a drive shaft 3 rotatably supported by the pump housing 2 and inserted in the pump element accommodation chamber 2a and a pump element 4 accommodated in the pump element accommodation chamber 2a and performing a pumping action by being driven by the drive shaft 3.

The pump housing 2 is formed by a bottomed cylindrical-shaped front housing 5 and a substantially disc-shaped rear housing 6 that closes an opening of the front housing 5.

The pump element (or pump component) 4 has a substantially ring-shaped adapter ring 7 fitted and fixed to an inner circumferential surface of a cylindrical portion 5a of the front housing 5, a substantially ring-shaped cam ring 8 movably provided in a substantially oval-shaped inner space inside the adapter ring 7, a rotor 9 provided at an inner circumferential side of the cam ring 8 and rotating integrally with the drive shaft 3 and a substantially disc-shaped pressure plate 10 disposed on an inner bottom surface 5b of the front housing 5 and sandwiching the cam ring 8 and the rotor 9 together with the rear housing 6.

Positioning of the adapter ring 7 and the pressure plate 10 in a circumferential direction with respect to the pump housing 2 is made by a positioning pin 11.

The adapter ring 7 is provided, at a portion on an after-mentioned first fluid pressure chamber 14 side with respect to the positioning pin 11 on an inner circumferential surface of the adapter ring 7, with a plate member 12 that serves as a rolling surface on which the cam ring 8 moves while rolling in the inner space of the adapter ring 7 and also serves as a seal member sealing a gap between the adapter ring 7 and the cam ring 8.

The adapter ring 7 is also provided, in a position radially opposite to the plate member 12 on the inner circumferential surface of the adapter ring 7, with a seal member 13 serving to seal a gap between the adapter ring 7 and the cam ring 8, like the plate member 12. These plate member 12 and seal member 13 define a pair of first and second fluid pressure chambers 14 and 15 between the adapter ring 7 and the cam ring 8.

The cam ring 8 is configured to move in right and left directions in FIG. 2 by a pressure difference between the first fluid pressure chamber 14 and the second fluid pressure chamber 15. With this movement, an eccentric amount of the cam ring 8 with respect to the rotor 9 is changed. The cam ring 8 is forced or pressed all the time in a direction in which the eccentric amount with respect to the rotor 9 becomes a maximum by a return spring 16 that is elastically connected to an outer circumference of the cam ring 8.

The rotor 9 is configured to rotate in a counterclockwise rotation (an arrow direction) in FIG. 2 as the drive shaft 3 rotates. The rotor 9 has, at substantially regular intervals in a circumferential direction at an outer circumference of the rotor 9, a plurality of slits (slots) 17 formed by being cut along a radial direction. Flat plate vanes 18 are each provided in the slits 17 so as to be able to move or extend/retract in the radial direction of the rotor 9.

Each vane 18 is pressed against an inner circumferential surface of the cam ring 8 by pressure of working fluid introduced into a back-pressure chamber 19 formed at an inner end portion of the slit 17, thereby partitioning an annular space between the cam ring 8 and the rotor 9 in the circumferential direction into a plurality of pump chambers 20.

A first inlet port 21 having, when viewed from the front, a substantially crescent-shape extending along the circumferential direction is formed on an inner end surface of the rear housing 6 which faces the pump element accommodation chamber 2a. More specifically, the first inlet port 21 is located at a section of the inner end surface of the rear housing 6 which corresponds to a suction section (suction area) where a volume of each pump chamber 20 gradually increases with rotation of the rotor 9. This first inlet port 21 communicates with a reservoir tank 23 through an inlet passage 22 formed in the rear housing 6 by e.g. drilling. With this structure, the working fluid stored in the reservoir tank 23 is introduced into the first inlet port 21 through the inlet passage 22, and is introduced or sucked into each pump chamber 20 by a pump suction action taken in the suction section.

Further, a second inlet port 24 having the substantially same shape as the first inlet port 21 is formed on a surface of the pressure plate 10 which faces the rotor 9. More specifically, the second inlet port 24 is located in a position opposite to the first inlet port 21. The second inlet port 24 communicates with a recessed portion 27 in which a seal ring 26 for sealing a gap between the front housing 5 and the drive shaft 3 is accommodated, through a return passage 25 formed in the front housing 5. That is, excess or redundant working fluid gathering in the recessed portion 27 is supplied to each pump chamber 20 through the return passage 25 and the second inlet port 24 by the pump suction action taken in the suction section, thereby suppressing leak of the excess oil (excess working fluid) to the outside of the pump.

In addition, a first outlet port 28 having, when viewed from the front, a substantially crescent-shape extending along the circumferential direction is formed on the surface of the pressure plate 10 which faces the rotor 9. More specifically, the first outlet port 28 is located at a section of the surface of the pressure plate 10 which corresponds to a discharge section (discharge area) where the volume of each pump chamber 20 gradually decreases with rotation of the rotor 9.

The first outlet port 28 communicates with an outlet passage 30 through a recessed pressure chamber 29 formed on the inner bottom surface 5b of the front housing 5 which faces the pressure plate 10. The working fluid discharged from each pump chamber 20 by the pumping action in the discharge section is pumped out to a hydraulic power cylinder (not shown) of a power steering device (not shown) through the first outlet port 28 and the outlet passage 30.

Further, a second outlet port 31 having the substantially same shape as the first outlet port 28 is formed on an inner side surface of the rear housing 6. More specifically, the second outlet port 31 is located in a position opposite to the first outlet port 28. As described above, the first and second inlet ports 21 and 24 and the first and second outlet ports 28 and 31 are located symmetrically in an axial direction with the pump chambers 20 sandwiched between these inlet and outlet ports, thereby keeping a pressure balance between axial direction both sides of the pump chambers 20.

A control valve 32 for controlling a pump discharge pressure is provided at an upper end side in the front housing 5.

This control valve 32 is installed in the front housing 5 from a left side to a right side in FIG. 2. The control valve 32 has a valve hole 33 whose opening end is closed with a plug 36, a bottomed cylindrical-shaped spool 34 which is accommodated slidably in an axial direction in the valve hole 33 and whose end portion, opposite to the opening end of the valve hole 33, is open, and a valve spring 35 which forces or presses the spool 34 all the time toward the plug 36.

By the fact that the valve hole 33 accommodates therein the spool 34, a high pressure chamber 37, a middle pressure chamber 38 and a low pressure chamber 39 are defined in the valve hole 33. The high pressure chamber 37 is located between the plug 36 and the spool 34, and a hydraulic pressure at an upstream side with respect to a metering orifice 30a formed in the outlet passage 30 is introduced into the high pressure chamber 37. The middle pressure chamber 38 accommodates therein the valve spring 35, and a hydraulic pressure at a downstream side with respect to the metering orifice 30a is introduced into the middle pressure chamber 38. The low pressure chamber 39 is formed at an outer peripheral side of the spool 34, and a pump suction pressure from the inlet passage 22 is introduced into the low pressure chamber 39 through a low pressure passage 40. The spool 34 is configured to move in the axial direction by a pressure difference between the high pressure chamber 37 and the middle pressure chamber 38.

More specifically, in a case where the pressure difference between the high pressure chamber 37 and the middle pressure chamber 38 is relatively small and the spool 34 is positioned at a plug 36 side by an urging force of the valve spring 35, a communication passage 41 connecting the first fluid pressure chamber 14 and the valve hole 33 opens to the low pressure chamber 39, then a relatively low pressure of the low pressure chamber 39 is introduced into the first fluid pressure chamber 14.

On the other hand, in a case where the pressure difference between the high pressure chamber 37 and the middle pressure chamber 38 is relatively great and the spool 34 moves to the right side in FIG. 2 against a pressure of the middle pressure chamber 38 and the urging force of the valve spring 35, the communication between the low pressure chamber 39 and the first fluid pressure chamber 14 is gradually interrupted, then the high pressure chamber 37 communicates with the first fluid pressure chamber 14 through the communication passage 41. With this communication, a high pressure of the high pressure chamber 37 is introduced into the first fluid pressure chamber 14.

In this manner, the pressure of the low pressure chamber 39 or the pressure of the high pressure chamber 37 is selectively introduced into the first fluid pressure chamber 14.

As for the second fluid pressure chamber 15, the pump suction pressure is introduced into the second fluid pressure chamber 15 all the time. When the pressure of the low pressure chamber 39 is introduced into the first fluid pressure chamber 14, the cam ring 8 moves (rolls) to a position in which the eccentric amount of the cam ring 8 with respect to the rotor 9 becomes a maximum by an urging force of the return spring 16, and a pump discharge amount becomes a maximum. On the other hand, when the pressure of the high pressure chamber 37 is introduced into the first fluid pressure chamber 14, the cam ring 8 moves (rolls) in a direction in which the eccentric amount of the cam ring 8 is decreased against the urging force of the return spring 16 by the pressure of the high pressure chamber 37, and the pump discharge amount is reduced.

The spool 34 is provided with a relief valve 42 that opens in a case where the pressure in the middle pressure chamber 38 exceeds a predetermined relief pressure, i.e. a pressure at the power steering device side exceeds the predetermined relief pressure, and reduces a pressure of the working fluid flowing in the outlet passage 30.

Figure 3:
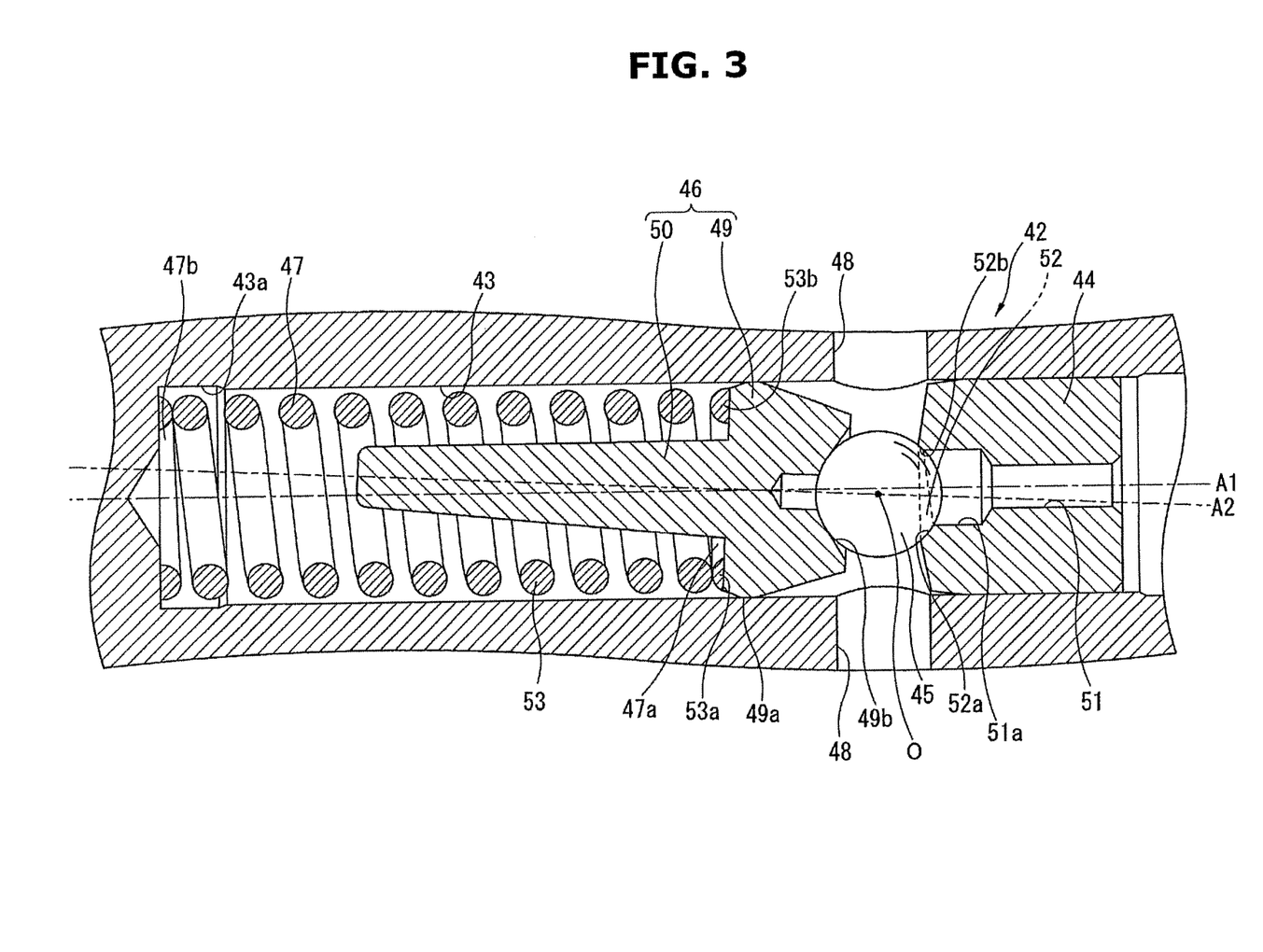
FIG. 3 is an enlarged longitudinal sectional view of a relief valve shown in FIG. 2.

As shown in FIG. 3, the relief valve 42 has a relief valve accommodation bore 43 formed at an inner peripheral side of the spool 34 and having a substantially circular shape in cross section, a substantially cylindrical valve seat 44 provided at one end side (at a right side in FIG. 3) in an axial direction (in a longitudinal direction) of the relief valve accommodation bore 43, i.e. at the opening end side of the spool 34, a ball 45 as a spherical valve body disposed at the other end side (at a left side in FIG. 3) of the relief valve accommodation bore 43 with respect to the valve seat 44, a retainer 46 provided movably in the axial direction in the relief valve accommodation bore 43 and disposed at the other end side of the relief valve accommodation bore 43 with respect to the ball 45, and a coil spring 47 elastically installed between a bottom of the relief valve accommodation bore 43 and the retainer 46 and forcing or pressing the retainer 46 toward the valve seat 44.

In the following explanation, an imaginary line passing through a bore center of the relief valve accommodation bore 43, which is a center of a cross section orthogonal to an axis that extends in an axial direction of the relief valve accommodation bore 43, and extending parallel to the axis, is called a center axis A1.

An end portion at the other end side of the relief valve accommodation bore 43 is formed as a large diameter portion 43a whose inside diameter is slightly greater than those of other portions, and an R-portion appearing in a corner between a bottom and an inner peripheral surface of the relief valve accommodation bore 43 during machining of the relief valve accommodation bore 43 is removed.

Further, a plurality of relief vents 48 are formed along a radial direction of the center axis A1 at a portion located slightly at the other end side with respect to the valve seat 44 on a peripheral wall of the spool 34 forming the relief valve accommodation bore 43. The relief valve accommodation bore 43 communicates with the low pressure chamber 39 through these relief vents 48.

The retainer 46 has a ball holding portion 49 as a valve body holding portion for holding or retaining the ball 45 and a shaft portion 50 extending from an end surface, at a coil spring 47 side, of the ball holding portion 49 toward the other end side of the relief valve accommodation bore 43.

The ball holding portion 49 has a reverse-tapered shape whose diameter gradually becomes greater toward the coil spring 47 side. The ball holding portion 49 is in sliding contact with the relief valve accommodation bore 43 with a slight radial direction clearance given between an outer peripheral edge 49*a*, at the coil spring 47 side, of the ball holding portion 49 and the inner peripheral surface of the relief valve accommodation bore 43.

Further, a mortar-shaped concave portion (or a bowl-shaped concave portion) 49*b* having rotation symmetry with respect to a shaft center A2 of the retainer 46 is formed on an end surface, at a valve seat 44 side, of the ball holding portion 49. The ball 45 is seated on the concave portion 49*b*, thereby limiting or restraining a relative displacement (or a relative movement) in a radial direction between the ball 45 and the retainer 46, and thus a center O of the ball 45 is positioned on the shaft center A2 of the retainer 46.

A first end-coil portion 47*a* that is an end-coil portion at one end side of the coil spring 47 is elastically connected to the end surface, at the coil spring 47 side, of the ball holding portion 49.

The shaft portion 50 has a reverse-tapered shape whose diameter gradually becomes greater toward a ball holding portion 49 side. The shaft portion 50 is accommodated inside the coil spring 47 and an outer peripheral surface of a root portion of the ball holding portion 49 contacts the first end-coil portion 47*a* of the coil spring 47, thereby limiting or restraining a relative displacement (or a relative movement) of a predetermined range or more in the radial direction between the retainer 46 and the coil spring 47.

The coil spring 47 is a typical coil spring formed by coiling steel wire 53. The coil spring 47 is formed so that a size (coil diameter) in the radial direction with respect to the center axis A1 is substantially constant in the axial direction. The first end-coil portion 47*a* and a second end-coil portion 47*b* of the coil spring 47, which are both end portions in the axial direction, are formed as so-called closed-ends. Each of the first and second end-coil portions 47*a* and 47*b* undergoes surface grinding in order to improve seating stability to a spring contact portion. The coil spring 47 is configured so that even when lean or inclination of the coil spring 47 arises due to offset load etc., lean or inclination of a predetermined angle or greater of the coil spring 47 is suppressed with an outer peripheral side of the coil spring 47 contacting the inner peripheral surface of the relief valve accommodation bore 43.

The valve seat 44 has an outer peripheral surface shaped along a shape of the inner peripheral surface of the relief valve accommodation bore 43. The valve seat 44 is press-fixed to one end side in the axial direction of the relief valve accommodation bore 43. The valve seat 44 has a substantially circular cross-section penetration hole 51 along the center axis A1.

The penetration hole 51 is formed so that a forming position of the penetration hole 51 on a cross section of the valve seat 44 orthogonal to the axial direction of the relief valve accommodation bore 43 is positioned substantially at a center of a substantially circular cross section of the relief valve accommodation bore 43. That is, the center axis A1 and a center of the penetration hole 51 are substantially identical with each other.

One end portion of the penetration hole 51 at an opening end side of the relief valve accommodation bore 43 communicates with the outlet passage 30 of a downstream side with respect to the metering orifice 30*a* through the middle pressure chamber 38. With this structure, when the ball 45 separates from the valve seat 44, a hydraulic pressure at the downstream side with respect to the metering orifice 30*a* of the outlet passage 30 is introduced into the relief valve accommodation bore 43.

The penetration hole 51 has, at a retainer 46 side, a large diameter hole portion 51*a* whose inside diameter is greater than those of other portions.

The valve seat 44 is provided, at an end portion thereof at a retainer 46 side, with a seat surface 52 as a seat portion on which the ball 45 is seated. More specifically, the seat surface 52 is formed throughout an entire hole edge of the large diameter hole portion 51*a* of the penetration hole 51.

Figure 4:
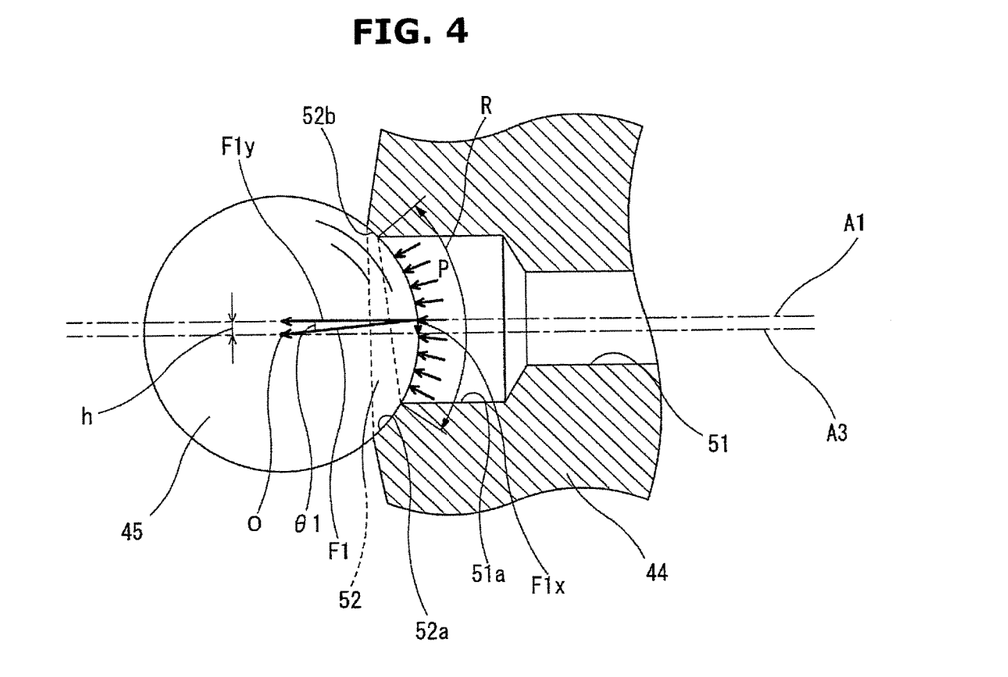
FIG. 4 is an enlarged longitudinal sectional view showing details of a valve seat shown in FIG. 3.
Figure 5:
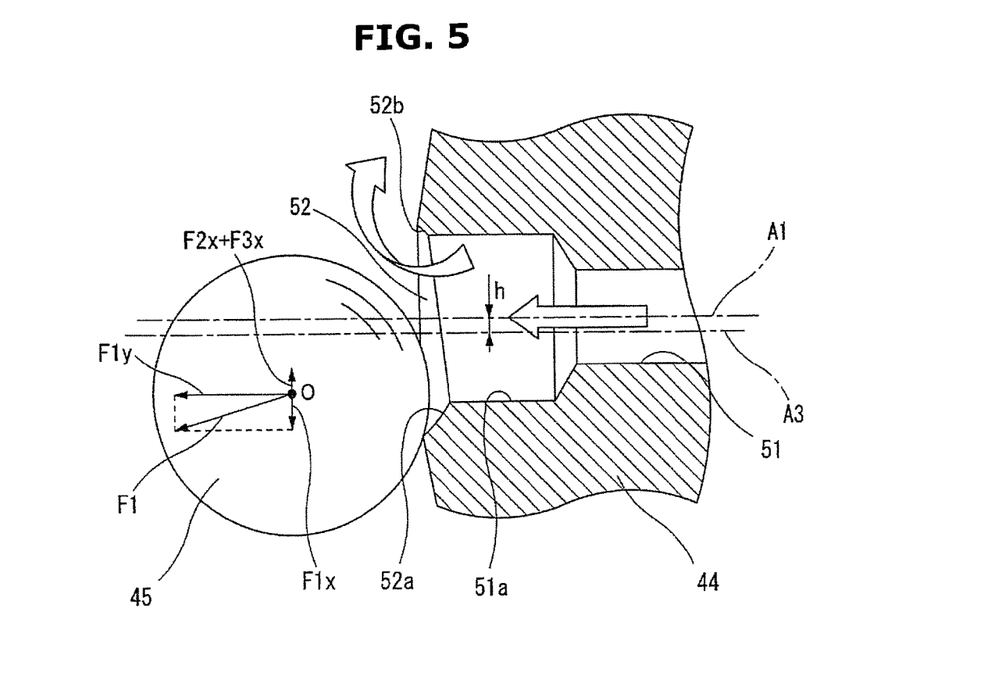
FIG. 5 is a drawing showing behavior of a valve body at opening of the relief valve.

As shown in FIGS. 4 and 5, this seat surface 52 is shaped into a ring-shaped surface having a part of spherical surface whose diameter is substantially the same as that of the ball 45. More specifically, the seat surface 52 is set so that a center A3 of the seat surface 52 on a cross section orthogonal to the axial direction of the relief valve accommodation bore 43 is offset in the radial direction from the center axis A1 by an offset amount h, and a width size in the radial direction of the seat surface 52 gradually varies in a circumferential direction of the ring-shaped seat surface 52.

That is, a wide portion 52*a* whose width size is a maximum and a narrow portion 52*b* whose width size is a minimum are formed in radially opposite positions on the seat surface 52. The width size of the seat surface 52 is gradually narrower in the circumferential direction from the wide portion 52*a* to the narrow portion 52*b*.

With this configuration, in a state in which the ball 45 is seated on the seat surface 52 shown in FIG. 4, a hydraulic pressure P from the middle pressure chamber 38 is exerted on the ball 45 with the ball 45 being offset from the center axis A1 to a wide portion 52*a* side by the offset amount h.

At this time, a pressing force F1 calculated by multiplying an area receiving the pressure P from the middle pressure chamber 38, i.e. an area (a pressure receiving area a) of a range R facing the large diameter hole portion 51*a*, by the pressure P acts on the ball 45, and the ball 45 is pressed in a valve opening direction. However, since the center A3 of the seat surface 52 is offset from the center axis A1 to the wide portion 52*a* side, the pressing force F1 is inclined to the wide portion 52*a* side with respect to the center axis A1 by an eccentric angle θ1.

Therefore, the ball 45 is pressed against the wide portion 52*a* side of the seat surface 52 by a radial direction component F1$x$ that is a resolved component, in a direction orthogonal to the center axis A1, of the pressing force F1 while being pressed in the valve opening direction by an axial direction component F1$y$ that is a resolved component, in a direction of the center axis A1, of the pressing force F1. Here, the radial direction component F1$x$ of the pressing force F1 can be calculated by the following expression (1).

$$F1x = P \times a \times \sin\theta 1 \qquad (1)$$

When the hydraulic pressure P from the middle pressure chamber 38 exceeds the predetermined relief pressure, as shown in FIG. 5, the ball 45 is pressed out (or pushed out) in the valve opening direction by the axial direction component F1y while being pressed against the wide portion 52a side of the seat surface 52 by the radial direction component F1x of the pressing force F1. At this time, the ball 45 rolls on the wide portion 52a of the seat surface 52 while continuing or keeping contact with the wide portion 52a, and the relief valve 42 opens with the ball 45 separated from a narrow portion 52b side.

As explained above, the relief valve 42 is configured so that the ball 45 performs opening/closure action in a state in which the ball 45 is pressed against the wide portion 52a side of the seat surface 52 by the radial direction component F1x of the pressing force F1. On the other hand, it was experimentally found that two forces F2 and F3 other than the pressing force F1, which are forces that oppose the radial direction component F1x of the pressing force F1, i.e. forces that return the ball 45 to the narrow portion 52b side of the seat surface 52, act on the ball 45.

Therefore, an offset configuration (or an offset structure) of the seat surface 52 of the present invention is formed so that a relationship between the radial direction component F1x of the pressing force F1 and radial direction components F2x and F3x of the forces F2 and F3 with respect to the center axis A1 satisfies the following expression (2).

$$F1x > F2x + F3x \qquad (2)$$

The force F2 is a first factor that reduces the radial direction component F1x of the pressing force F1 which attempts to press the ball 45 against the wide portion 52a side of the seat surface 52. The force F2 indicates a force acting on the ball 45 according to or caused by lean or inclination of the retainer 46.

Figure 6:
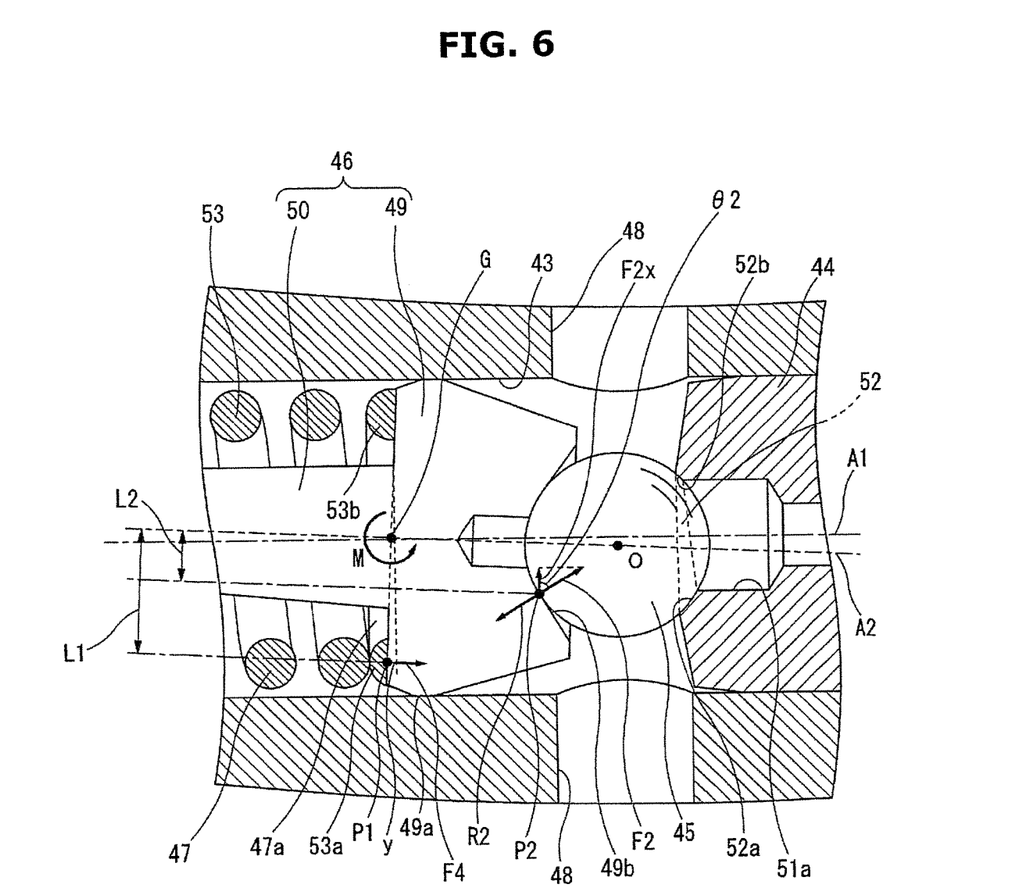

More specifically, as shown in FIG. 6, when the ball 45 is seated while being offset to the wide portion 52a side with respect to the center axis A1 by the offset structure of the seat surface 52, the retainer 46 attempts to move to the wide portion 52a side by the offset of the ball 45. However, at this time, when the radial direction clearance between the inner peripheral surface of the relief valve accommodation bore 43 and the outer peripheral edge 49a of the ball holding portion 49 is an extremely slight clearance, a portion of the outer peripheral edge 49a which is located on the wide portion 52a side with respect to the center axis A1 interferes with the inner peripheral surface of the relief valve accommodation bore 43, and as a consequence, the outer peripheral edge 49a side leans to the wide portion 52a side with respect to the center axis A1.

Then, since a portion of the coil spring 47 which is located on the wide portion 52a side with respect to the center axis A1 is more compressed as compared with a portion of the coil spring 47 which is located on the narrow portion 52b side with respect to the center axis A1 due to the lean of the retainer 46, an urging force F4 based on a difference in a compression amount is generated only at a contact point P1 located on the wide portion 52a side. This urging force F4 can be calculated by multiplying a spring constant k of the coil spring 47 by a difference y in the compression amount between the portion of the coil spring 47 located on the wide portion 52a side and the portion of the coil spring 47 located on the narrow portion 52b side.

When this urging force F4 acts on the retainer 46, the above mentioned force F2 acts on the ball 45 through a contact point P2 between the concave portion 49b of the retainer 46 and the ball 45.

Here, when the force F2 acts on the ball 45 from the retainer 46, a reaction force R2 of the force F2 simultaneously acts on the retainer 46 from the ball 45. The force F2 can be calculated by an expression of balance of the moment M on a barycenter (center of gravity) G of the retainer 46 based on the reaction force R2 and the urging force F4.

That is, when an arm length (or distance) from the center of gravity G of the retainer 46 to the contact point P1 is L1 and an arm length (or distance) from the center of gravity G to the contact point P2 is L2, the balance of the moment M on the center of gravity G of the retainer 46 can be determined as an approximate value by the following expression (3).

$$F4 \times L1 = R2 \times L2 \qquad (3)$$

Further, by replacing the reaction force R2 with the force F2 and using the expression (3), the following expression (4) can be obtained.

$$F2 = F4 \times \frac{L1}{L2} \qquad (4)$$

Then, by resolving the force F2 obtained from the expression (4) with an angle formed between the force F2 and a line orthogonal to the center axis A1 being an angle θ2, the radial direction component F2x of the force F2 expressed in the expression (2) can be obtained. More specifically, the radial direction component F2x of the force F2 can be determined by the following expression (5).

$$F2x = F4 \times \frac{L1}{L2} \times \cos\theta 2 \qquad (5)$$

The force F3 is a second factor that can reduce the radial direction component F1x of the pressing force F1 which attempts to press the ball 45 against the wide portion 52a side of the seat surface 52. The force F3 indicates a force acting on the ball 45 according to or caused by a deviation of an urging force in a circumferential direction of the coil spring 47.

Figure 7:
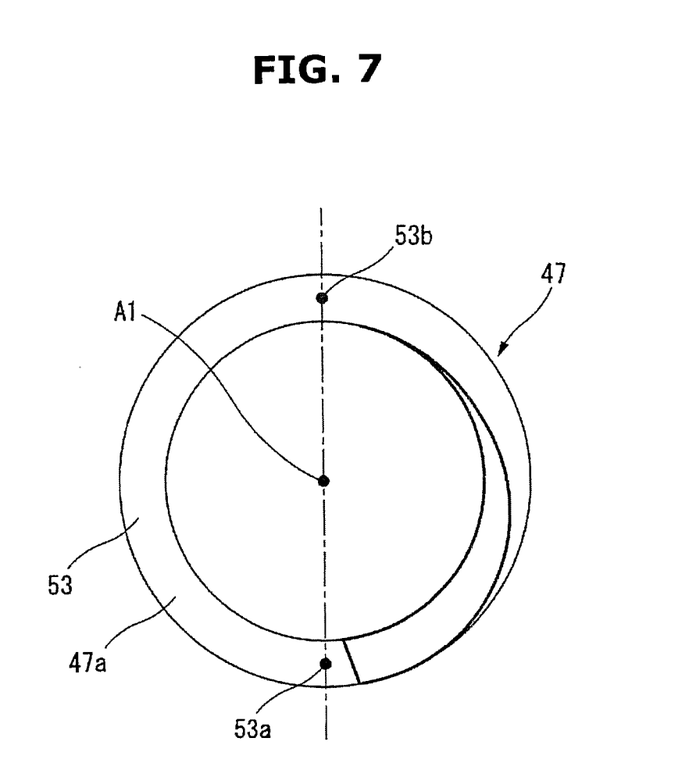
FIG. 7 is a drawing of a coil spring viewed from a retainer side.

More specifically, due to the fact that the coil spring 47 is formed by coiling the steel wire 53, as can be seen in FIGS. 3 and 7, rigidity of one end portion 53a of the first end-coil portion 47a which is a coiling-start portion (winding-start portion) of the steel wire 53 is high because a second coiling-portion (second winding-portion) of the coil spring 47 contacts or is close to the one end portion 53a, while rigidity of a portion 53b positioned on an opposite side to the one end portion 53a with respect to the center axis A1 is relatively low because the second coiling-portion of the coil spring 47 is separate from this portion 53b. As described above, the coil spring 47 has a high rigidity portion and a low rigidity portion when viewed locally. A spring constant in the circumferential direction of the coil spring 47 varies or are different according to this nonuniform rigidity.

Due to the variation or difference of the spring constant in the circumferential direction, an urging force, which is force F5 greater than an urging force of the opposite side portion 53b forcing or pressing the retainer 46, is generated at the one end portion 53a of the steel wire 53 of the coil spring 47.

Here, although a position of the one end portion 53a of the steel wire 53 of the coil spring 47 is moved or changed by vibration etc., a worst case where the radial direction component F3x is a maximum, i.e. a case where the one end portion 53a of the steel wire 53 is positioned on the wide portion 52a side with respect to the center axis A1, will be explained.

Figure 8:
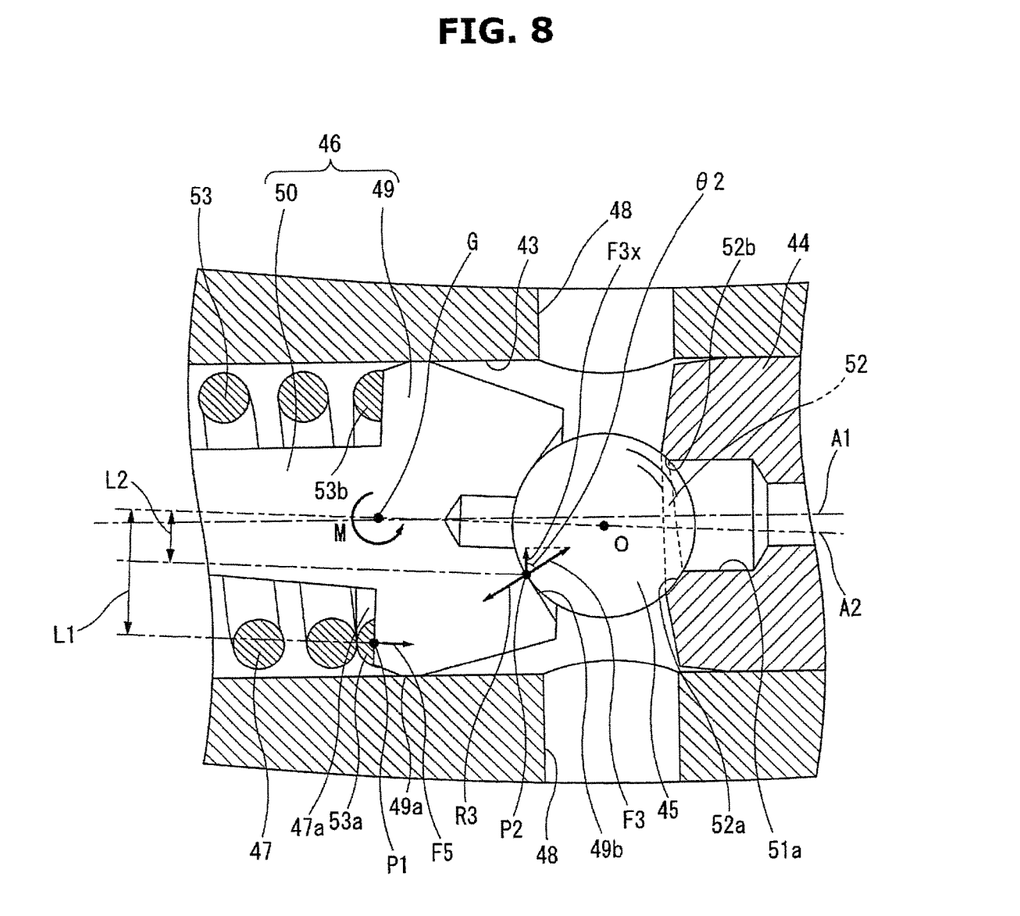
FIG. 8 is a drawing showing an essential part of FIG. 3 with forces acting on the valve body caused by a deviation of an urging force in a circumferential direction of the coil spring indicated by vectors.

That is, as shown in FIG. 8, when the force F5 acts on the retainer 46 from the one end portion 53a of the steel wire 53 of the coil spring 47, the force F3 acts on the ball 45 through the contact point P2 between the concave portion 49b of the retainer 46 and the ball 45. In the same manner as calculation of the force F2, the force F3 can be determined by the following expression (6) obtained by converting the expression of the balance of the moment M on the center of gravity G of the retainer 46.

$$F3 = F5 \times \frac{L1}{L2} \qquad (6)$$

Then, by resolving the force F3 obtained from the expression (6) with an angle formed between the force F3 and a line orthogonal to the center axis A1 being an angle 92, the radial direction component F3x of the force F3 expressed in the expression (2) can be obtained. More specifically, the radial direction component F3x of the force F3 can be determined by the following expression (7).

$$F3x = F5 \times \frac{L1}{L2} \times \cos\theta 2 \qquad (7)$$

[Working and Effect of First Embodiment]

In the pump device 1, the seat surface 52 is configured so that the expression (2) is established. Therefore, even if the worst case where the one end portion 53a of the steel wire 53 of the coil spring 47 is positioned on the wide portion 52a side with respect to the center axis A1 arises, the radial direction component F1x acting on the ball 45 in the direction in which the ball 45 is pressed against the wide portion 52a exceeds a total of the radial direction components F2x and F3x acting on the ball 45 in the direction in which the ball 45 is returned to the narrow portion 52b side. That is, the ball 45 is pressed in the valve opening direction by the axial direction component F1y of the pressing force F1 with the ball 45 pressed against the wide portion 52a all the time.

With this configuration, upon the valve opening, the ball 45 can roll on the wide portion 52a of the seat surface 52 while continuing or keeping contact with the wide portion 52a, and the relief valve 42 can open with the ball 45 separated from the narrow portion 52b side, as shown in FIGS. 4 and 5. Thus, the relief pressure flows on the narrow portion 52b side as shown by an arrow in FIG. 5, then the ball 45 is stably held with the ball 45 contacting the wide portion 52a of the seat surface 52. Hence, vibration of the ball 45 is suppressed, thereby suppressing noise of the relief valve 42 caused by the vibration.

Further, in the present embodiment, the force F3 acting on the ball 45 is based on the force F5 that is the difference between the urging force of the one end portion 53a of the steel wire 53 of the coil spring 47 and the urging force of the opposite side portion 53b positioned on the opposite side to the one end portion 53a with respect to the center axis A1, and the force F3 can be calculated from the force F5 by the expression (6). That is, as long as the force F5 is correctly measured, the force F3 and the radial direction component F3x of the force F3 can be properly calculated from the measured force F5.

With this, a value of the radial direction component F3x in the expression (2) is determined. Thus, a forming position etc. of the seat surface 52 can be set by taking only a relationship between the remaining radial direction components F1x and F2x into account. This facilitates establishment of the expression (2).

Furthermore, in the present embodiment, by forming the large diameter portion 43a at the other end side of the relief valve accommodation bore 43, the R-portion appearing in the corner between the bottom and the inner peripheral surface of the relief valve accommodation bore 43 is removed. It is therefore possible to suppress leaning of the coil spring 47 due to the fact that the coil spring 47 rides on the R-portion. This can solve a problem of impairing stability of the ball 45 which is caused by the fact that a force toward the narrow portion 52b side acts on the ball 45 due to the lean of the coil spring 47. Generation of the noise from the relief valve 42 can therefore surely be suppressed.

Second Embodiment

Figure 9:
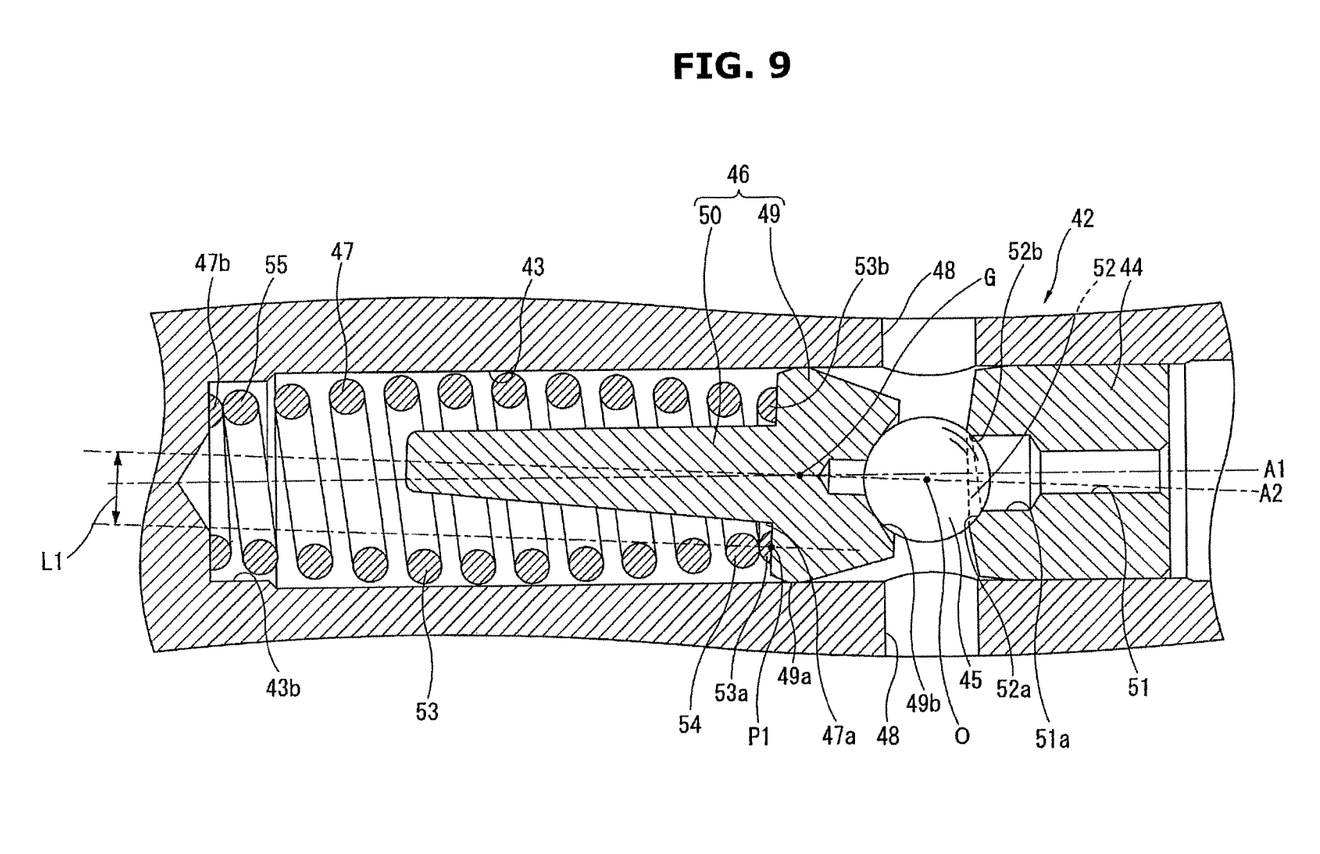
FIG. 9 is a longitudinal sectional view of the relief valve according to a second embodiment.

In a second embodiment shown in FIG. 9, a shape of the coil spring 47 is changed to a barrel shape. In the present embodiment (also, in the following embodiments), the same element or component as that of the first embodiment is indicated by the same reference sign, and its detailed explanation will be omitted.

That is, the coil spring 47 of the present embodiment has, at one end portion thereof at the retainer 46 side, a first tapered portion 54 whose radial direction size (coil diameter) with respect to the center axis A1 is gradually smaller from the other end side (a left side in FIG. 9) toward one end side (a right side in FIG. 9), and also has, at the other end portion thereof, a second tapered portion 55 whose coil diameter is gradually smaller from the one end side (the right side in FIG. 9) toward the other end side (the left side in FIG. 9).

In addition, by the change of the shape of the coil spring 47, an end portion at the other end side of the relief valve accommodation bore 43 is formed as a small diameter portion 43b whose inside diameter is smaller than those of other portions.

In the second embodiment, since the first tapered portion 54 is provided at the one end portion of the coil spring 47, the arm length L1 from the center of gravity G of the retainer 46 to the contact point P1 which is used in the expressions (5) and (7) can be shorter than that of the first embodiment. Therefore, the radial direction component F2x determined by the expression (5) and the radial direction component F3x determined by the expression (7) are small values, thereby facilitating establishment of the expression (2) for the offset structure of the seat surface 52.

Here, when using the barrel-shaped coil spring 47, the above effect can be obtained. However, since the second tapered portion 55 whose coil diameter is smaller than an inside diameter of the relief valve accommodation bore 43 shifts or leans in the radial direction with respect to the relief valve accommodation bore 43, there is a risk that the coil spring 47 will lean. Further, depending on a direction in which the coil spring 47 leans, the urging force of the coil spring 47 acts on the ball 45 in a direction in which the ball 45 is returned to the narrow portion 52b side, and this might impair stability of the ball 45.

For this risk, in the second embodiment, the small diameter portion 43b is formed at the other end portion of the relief valve accommodation bore 43, and by an inner peripheral surface of this small diameter portion 43b, the shift or lean of the second tapered portion 55 in the radial direction with respect to the relief valve accommodation bore 43 is suppressed. The lean of the coil spring 47 is therefore suppressed, and an urging direction of the coil spring 47 can be set along the center axis A1. The force in the direction in which the ball 45 is returned to the narrow portion 52b side is thus suppressed, thereby suppressing reduction in stability of the ball 45 and suppressing the generation of the noise from the relief valve 42.

In the second embodiment, although the barrel-shaped coil spring is used as the coil spring 47, as long as the coil spring 47 has, at one end portion thereof at the retainer 46 side, the first tapered portion 54, the shape of the coil spring 47 is not limited to this barrel shape. For instance, it is possible to use a reverse-tapered coil spring, having a trapezoidal shape viewed from a side, whose coil diameter gradually becomes greater from the one end portion toward the other end portion.

Third Embodiment

Figure 10:
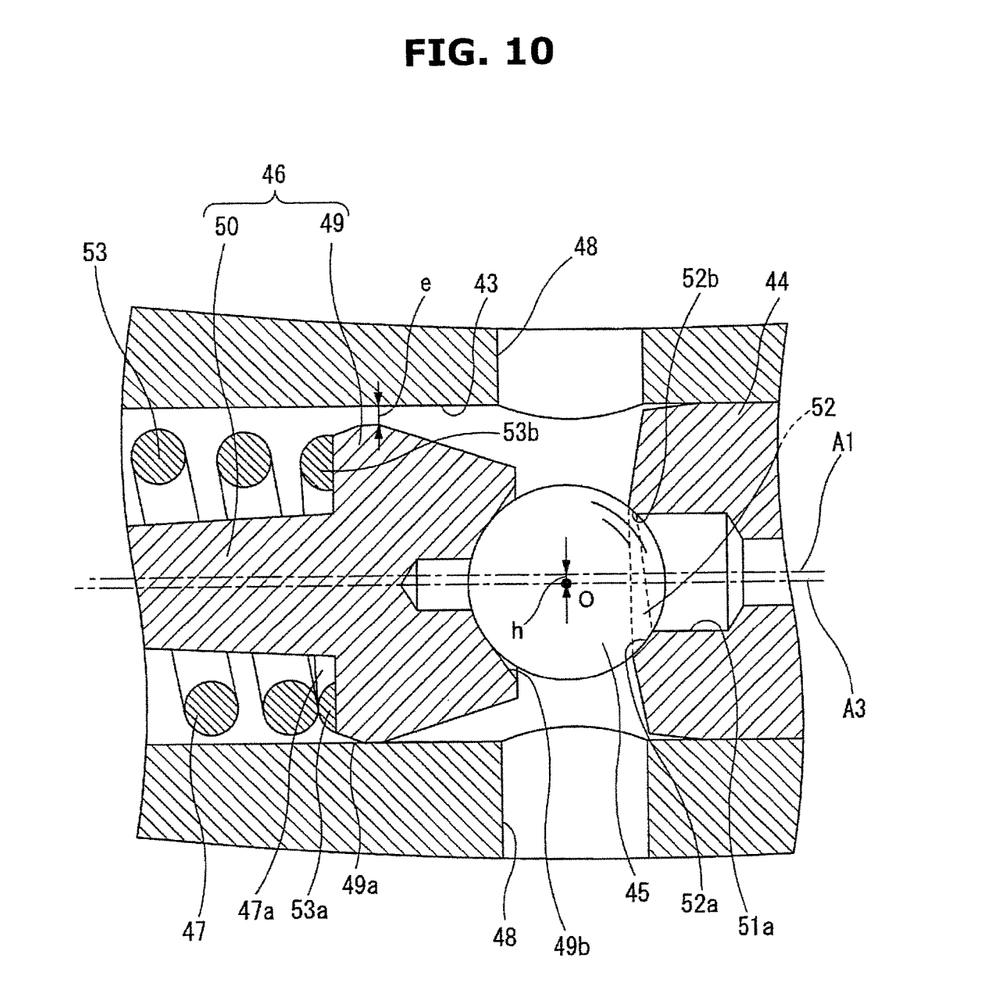
FIG. 10 is an enlarged longitudinal sectional view of an essential part of the relief valve according to a third embodiment.

In a third embodiment shown in FIG. 10, an outside diameter of the outer peripheral edge 49a of the ball holding portion 49 is slightly smaller than that of the first embodiment, and a diameter clearance e in the radial direction with respect to the center axis A1 is provided between the outer peripheral edge 49a and the inner peripheral surface of the relief valve accommodation bore 43. Further, the offset amount h of the seat surface 52 is set so as to satisfy the following expression (8).

$$2h \le e \qquad (8)$$

In the pump device 1 of the third embodiment, the seat surface 52 is formed so that the offset amount h is half of the diameter clearance e or smaller. Therefore, the ball 45 is offset by this offset configuration of the seat surface 52. In addition, interference between the portion of the outer peripheral edge 49a of the ball holding portion 49 which is located on the wide portion 52a side and the inner peripheral surface of the relief valve accommodation bore 43 when the retainer 46 is offset can be suppressed, and the lean of the retainer 46 due to the interference can be suppressed.

Since the force F2 and the radial direction component F2x of the force F2 acting on the ball 45 according to or caused by the lean of the retainer 46 become substantially zero, the expression (2) can be easily established. As a consequence, the generation of the noise upon opening of the relief valve 42 can readily be suppressed.

Fourth Embodiment

Figure 11:
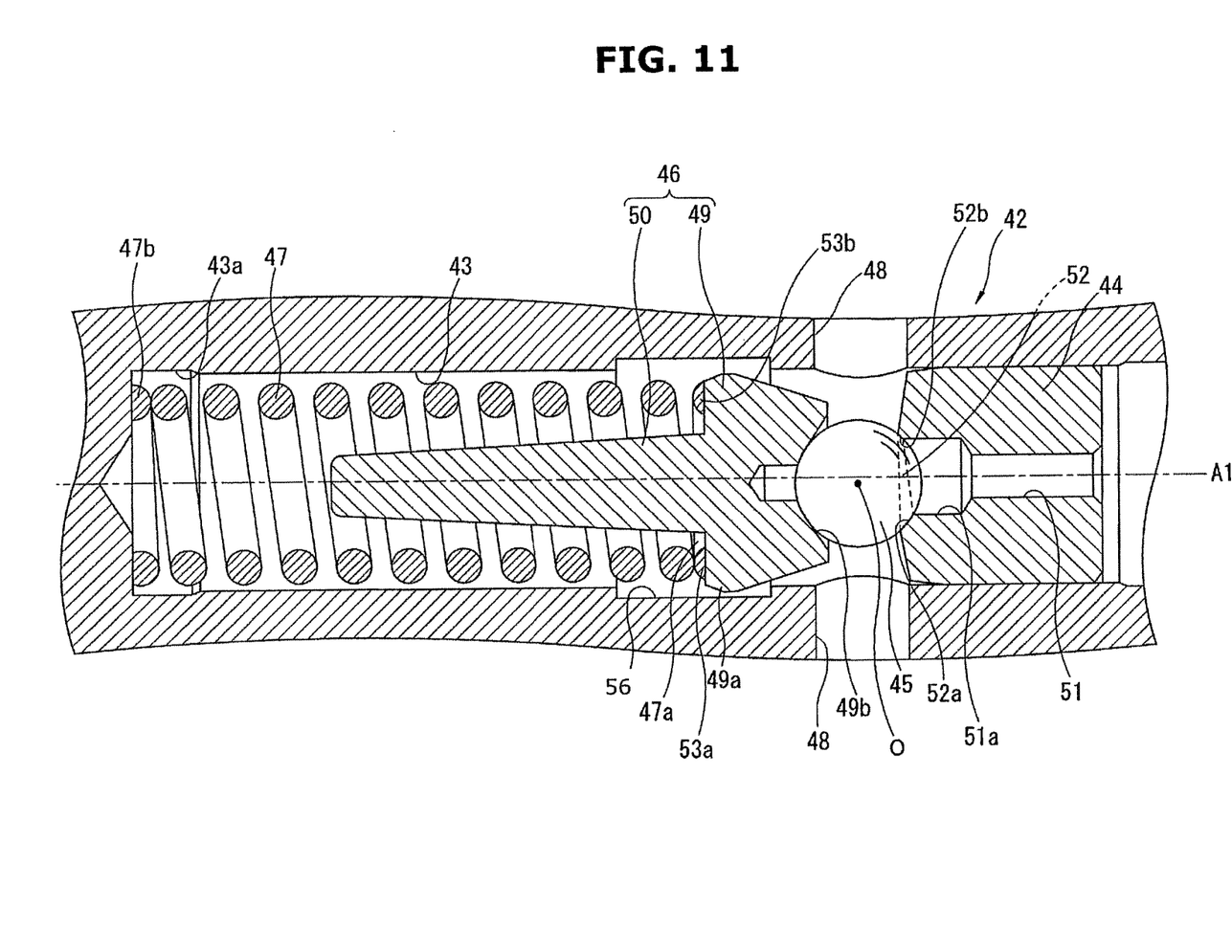
FIG. 11 is a longitudinal sectional view of the relief valve according to a fourth embodiment.

In a fourth embodiment shown in FIG. 11, the relief valve accommodation bore 43 has a substantially annular escape groove (or annular recessed groove) 56 in an area on the inner peripheral surface which the ball holding portion 49 overlaps in the axial direction. That is, an inside diameter of the area on the inner peripheral surface of the relief valve accommodation bore 43 which the ball holding portion 49 overlaps in the axial direction is set to be greater than an inside diameter of an area on the inner peripheral surface of the relief valve accommodation bore 43 which the shaft portion 50 overlaps in the axial direction.

In the pump device 1 of the fourth embodiment, since the escape grove 56 is provided on the inner peripheral surface of the relief valve accommodation bore 43, interference between the outer peripheral edge 49a of the ball holding portion 49 and the inner peripheral surface of the relief valve accommodation bore 43 when the retainer 46 is offset by the offset configuration of the seat surface 52 can be suppressed by the escape grove 56. Also, the lean of the retainer 46 due to the interference can be suppressed.

In the same manner as the third embodiment, since the force F2 and the radial direction component F2x of the force F2 acting on the ball 45 according to or caused by the lean of the retainer 46 become substantially zero, the expression (2) can be easily established. As a consequence, the generation of the noise upon opening of the relief valve 42 can readily be suppressed.

The present invention is not limited to structure or configuration of the above embodiments. For instance, in the above embodiments, the relief valve 42 (the relief valve accommodation bore 43) is provided inside the control valve 32. However, the relief valve 42 (the relief valve accommodation bore 43) could be provided as a separate valve from the control valve 32 in the pump housing 2.

From the foregoing, the present invention includes the following structure or configuration of the pump device, and has the following effects.

A pump device (1) comprises; a pump housing (2) having a pump element accommodation space (2a); a drive shaft (3) rotatably supported by the pump housing (2); an inlet port (21, 24) provided in the pump housing (2) and introducing working fluid from a reservoir tank (23); an outlet port (28, 31) provided in the pump housing (2); a pump element (4) accommodated in the pump element accommodation space (2a), sucking the working fluid from the inlet port (21, 24) by being rotated by the drive shaft (3) and discharging the working fluid from the outlet port (28, 31); an inlet passage (22) provided in the pump housing (2) and communicating with the inlet port (21, 24); an outlet passage (30) provided in the pump housing (2) and communicating with the outlet port (28, 31); a relief valve accommodation bore (43) provided in the pump housing (2) and having a substantially circular shape in cross section. Further, when an imaginary line passing through a bore center of the relief valve accommodation bore (43), which is a center of a cross section orthogonal to an axis that extends in an axial direction that is a longitudinal direction of the relief valve accommodation bore (43), and extending parallel to the axis, is a center axis (A1), the pump device (1) comprises; a valve seat (44) provided at one end side in the axial direction of the relief valve accommodation bore (43) and having a substantially cylindrical shape whose outer peripheral surface is shaped along a shape of an inner peripheral surface of the relief valve accommodation bore (43); a penetration hole (51) that is an axial direction hole provided at the valve seat (44) so as to penetrate the valve seat (44) in the axial direction, the penetration hole (51) formed so that one end portion, which is located at the one end side of the relief valve accommodation bore (43), of both end portions of the penetration hole (51) communicates with the outlet passage (30) and so that a forming position of the penetration hole (51) on a cross section of the valve seat (44) orthogonal to the axial direction of the relief valve accommodation bore (43) is positioned substantially at a center of a substantially circular cross section of the relief valve accommodation bore (43); a seat portion (52) provided at the other end side in the axial direction of the valve seat (44) and formed into a ring-shape so as to encircle the penetration hole (51), the seat portion (52) set so that a center (A3) of the seat portion (52) on a cross section orthogonal to the axial direction of the relief valve accommodation bore (43) is offset from the center axis (A1); a spherical valve body (45) performing opening and closure actions of the penetration hole (51) by separation from and contact with the seat portion (52); a retainer (46) provided movably in the axial direction in the relief valve accommodation bore (43) and disposed at the other end side of the relief valve accommodation bore (43) with respect to the valve body (45), the retainer (46) having a valve body holding portion (49) for retaining the valve body (45) and shaft portion (50) extending from an end surface of the valve body holding portion (49) toward the other end side of the relief valve accommodation bore (43); a coil spring (47) provided in the relief valve accommodation bore (43) and forcing the retainer (46) so that the valve body (45) retained by retainer (46) contacts the seat portion (52); and a relief vent (48) provided at the other end side of the relief valve accommodation bore (43) with respect to the valve seat (44) so as to be open to the relief valve accommodation bore (43), the relief vent (48) discharging the working fluid in the relief valve accommodation bore (43) into the inlet passage (22). And, when a radial direction component, with respect to the center axis (A1), of a pressing force (F1) according to a pressure (P) of the working fluid in the penetration hole (51) which the valve body (45) receives in an inner side area of the ring-shaped seat portion (52) in a state in which the valve body (45) contacts the seat portion (52) is F1$x$, and a radial direction component, with respect to the center axis (A1), of a force (F2) which reduces the radial direction component F1$x$ due to lean of the retainer (46) with respect to the center axis (A1) is F2$x$, and also a radial direction component, with respect to the center axis (A1), of a force (F3) according to an urging force of the coil spring (47), which reduces the radial direction component F1$x$ is F3$x$, the seat portion (52) is formed so as to satisfy an expression of F1$x$>F2$x$+F3$x$.

As a preferable example, when a radial direction clearance with respect to the center axis (A1) between an outer peripheral edge (49$a$) of the valve body holding portion (49) and an inner peripheral surface of the relief valve accommodation bore (43) is e, and a radial direction offset amount, with respect to the center axis (A1), of a center (O) of the valve body (45) from the center axis (A1) is h, the seat portion (52) is formed so as to satisfy an expression 2h≤e.

As further preferable example, the coil spring (47) has a tapered portion (54) whose radial direction size with respect to the center axis (A1) is gradually smaller from the other end side toward the one end side of the relief valve accommodation bore (43).

As a further preferable example, the coil spring (47) is a coiled steel wire (53), and the radial direction component F3$x$ is a radial direction component, with respect to the center axis (A1), of rotation moment of the valve body holding portion (49) which occurs by a difference in the urging force forcing the retainer (46) in the axial direction between an axial direction one end portion (53$a$) of the steel wire (53) and an opposite end portion (53$b$) to the axial direction one end portion (53$a$) of the steel wire (53).

As a further preferable example, the relief valve accommodation bore (43) is formed so that an inside diameter of an area on an inner peripheral surface of the relief valve accommodation bore (43) which the valve body holding portion (49) overlaps in the axial direction is greater than an inside diameter of an area on the inner peripheral surface of the relief valve accommodation bore (43) which the shaft portion (50) overlaps in the axial direction.

The entire contents of Japanese Patent Application No. 2016-055825 filed on Mar. 18, 2016 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:
1. A pump device comprising:
a pump housing having a pump element accommodation space;
a drive shaft rotatably supported by the pump housing;
an inlet port provided in the pump housing and introducing working fluid from a reservoir tank;
an outlet port provided in the pump housing;
a pump element accommodated in the pump element accommodation space, sucking the working fluid from the inlet port by being rotated by the drive shaft and discharging the working fluid from the outlet port;
an inlet passage provided in the pump housing and communicating with the inlet port;
an outlet passage provided in the pump housing and communicating with the outlet port;
a relief valve accommodation bore provided in the pump housing and having a substantially circular shape in cross section;
when an imaginary line passing through a bore center of the relief valve accommodation bore, which is a center of a cross section orthogonal to an axis that extends in an axial direction that is a longitudinal direction of the relief valve accommodation bore, and extending parallel to the axis, is a center axis,
a valve seat provided at one end side in the axial direction of the relief valve accommodation bore and having a substantially cylindrical shape whose outer peripheral surface is shaped along a shape of an inner peripheral surface of the relief valve accommodation bore;
a penetration hole that is an axial direction hole provided at the valve seat so as to penetrate the valve seat in the axial direction, the penetration hole formed so that one end portion, which is located at the one end side of the relief valve accommodation bore, of both end portions of the penetration hole communicates with the outlet passage and so that a forming position of the penetration hole on a cross section of the valve seat orthogonal to the axial direction of the relief valve accommodation bore is positioned substantially at a center of a substantially circular cross section of the relief valve accommodation bore;
a seat portion provided at the other end side in the axial direction of the valve seat and formed into a ring-shape so as to encircle the penetration hole, the seat portion set so that a center of the seat portion on a cross section orthogonal to the axial direction of the relief valve accommodation bore is offset from the center axis;
a spherical valve body performing opening and closure actions of the penetration hole by separation from and contact with the seat portion;
a retainer provided movably in the axial direction in the relief valve accommodation bore and disposed at the other end side of the relief valve accommodation bore with respect to the valve body, the retainer having a valve body holding portion for retaining the valve body and shaft portion extending from an end surface of the valve body holding portion toward the other end side of the relief valve accommodation bore;
a coil spring provided in the relief valve accommodation bore and forcing the retainer so that the valve body retained by retainer contacts the seat portion; and
a relief vent provided at the other end side of the relief valve accommodation bore with respect to the valve seat so as to be open to the relief valve accommodation bore, the relief vent discharging the working fluid in the relief valve accommodation bore into the inlet passage, and when a radial direction component, with respect to the center axis, of a pressing force according to a pressure of the working fluid in the penetration hole which the valve body receives in an inner side area of the ring-shaped seat portion in a state in which the valve body contacts the seat portion is $F1x$, and a radial direction component, with respect to the center axis, of a force which reduces the radial direction component $F1x$ due to lean of the retainer with respect to the center axis is $F2x$, and also a radial direction component, with respect to the center axis, of a force according to an urging force of the coil spring, which reduces the radial direction component $F1x$ is $F3x$, the seat portion being formed so as to satisfy an expression of $F1x > F2x + F3x$.

2. The pump device as claimed in claim 1, wherein:

when a radial direction clearance with respect to the center axis between an outer peripheral edge of the valve body holding portion and an inner peripheral surface of the relief valve accommodation bore is e, and a radial direction offset amount, with respect to the center axis, of a center of the valve body from the center axis is h, the seat portion is formed so as to satisfy an expression $2h \leq e$.

3. The pump device as claimed in claim 1, wherein:

the coil spring has a tapered portion whose radial direction size with respect to the center axis is gradually smaller from the other end side toward the one end side of the relief valve accommodation bore.

4. The pump device as claimed in claim 1, wherein:

the coil spring is a coiled steel wire, and the radial direction component $F3x$ is a radial direction component, with respect to the center axis, of rotation moment of the valve body holding portion which occurs by a difference in the urging force forcing the retainer in the axial direction between an axial direction one end portion of the steel wire and an opposite end portion to the axial direction one end portion of the steel wire.

5. The pump device as claimed in claim 1, wherein:

the relief valve accommodation bore is formed so that an inside diameter of an area on an inner peripheral surface of the relief valve accommodation bore which the valve body holding portion overlaps in the axial direction is greater than an inside diameter of an area on the inner peripheral surface of the relief valve accommodation bore which the shaft portion overlaps in the axial direction.

* * * * *